(12) United States Patent
Li et al.

(10) Patent No.: US 11,568,216 B2
(45) Date of Patent: Jan. 31, 2023

(54) METHOD AND APPARATUS FOR ADAPTING FEATURE DATA IN A CONVOLUTIONAL NEURAL NETWORK

(71) Applicant: NANJING HORIZON ROBOTICS TECHNOLOGY CO., LTD., Nanjing (CN)

(72) Inventors: Jianjun Li, Beijing (CN); Chang Huang, Beijing (CN); Liang Chen, Beijing (CN); Kun Ling, Beijing (CN); Delin Li, Beijing (CN)

(73) Assignee: Nanjing Horizon Robotics Technology Co., Ltd., Nanjing (CN)

(*) Notice: Subject to any disclaimer, the term of this patent is extended or adjusted under 35 U.S.C. 154(b) by 1108 days.

(21) Appl. No.: 16/196,063

(22) Filed: Nov. 20, 2018

(65) Prior Publication Data

US 2019/0156185 A1 May 23, 2019

(30) Foreign Application Priority Data

Nov. 21, 2017 (CN) .......................... 201711163211.7

(51) Int. Cl.
*G06N 3/04* (2006.01)
*G06N 3/08* (2006.01)
(Continued)

(52) U.S. Cl.
CPC ....... *G06N 3/0481* (2013.01); *G06F 12/0875* (2013.01); *G06F 17/15* (2013.01); *G06N 3/0454* (2013.01); *G06N 3/082* (2013.01)

(58) Field of Classification Search
CPC .... G06N 3/0481; G06N 3/0454; G06N 3/082; G06F 12/0875; G06F 17/15
(Continued)

(56) References Cited

U.S. PATENT DOCUMENTS

2016/0342888 A1   11/2016   Yang et al.
2016/0350645 A1   12/2016   Brothers et al.
(Continued)

FOREIGN PATENT DOCUMENTS

CN   106203619 A   12/2016
CN   107239824 A   10/2017
(Continued)

OTHER PUBLICATIONS

Alwani et al., "Fused-Layer CNN Accelerators", 2016 49th Annual IEEE/ACM International Symposium on Microarchitecture (Micro), Oct. 2016, pp. 1-12.
Anwar et al., "Coarse Pruning of Convolutional Neural Networks with Random Masks", Jan. 18, 2017; retrieved from the Internet: <https://openreview.net/pdf?id=HkvS3Mqxe> [retrieved on Apr. 15, 2019].
(Continued)

*Primary Examiner* — Emmanuel Bayard
(74) *Attorney, Agent, or Firm* — K&L Gates LLP

(57) ABSTRACT

A method and an apparatus for adapting feature data in a convolutional neural network. The method includes selecting a plurality of consecutive layers; determining an expected number of subdata blocks and a layout position, width and height of each subdata block in an output feature data of a last layer; determining, for each current layer, a layout position, width, and height of each subdata block of an input feature data for the current layer according to the layout position, width, and height of each subdata block of the output feature data for the current layer; determining an actual position of each subdata block of the input feature data for a first layer in the input feature data for the first layer; and obtaining the expected number of subdata blocks of the input feature data for the first layer according to the
(Continued)

actual position, width and height of each subdata block of the input feature data for the first layer.

18 Claims, 7 Drawing Sheets

(51) Int. Cl.
 *G06F 12/0875* (2016.01)
 *G06F 17/15* (2006.01)
(58) Field of Classification Search
 USPC .......................................................... 706/15
 See application file for complete search history.

(56) References Cited

U.S. PATENT DOCUMENTS

| | | | |
|---|---|---|---|
| 2017/0169315 A1* | 6/2017 | Vaca Castano | G06V 10/454 |
| 2017/0344876 A1 | 11/2017 | Brothers | |
| 2018/0032857 A1* | 2/2018 | Lele | G06N 3/0454 |
| 2018/0218587 A1 | 8/2018 | Wong et al. | |
| 2019/0114391 A1* | 4/2019 | Jaganathan | G06N 3/0472 |
| 2019/0220734 A1* | 7/2019 | Ferdman | G06N 3/0454 |
| 2020/0117993 A1* | 4/2020 | Martinez-Canales | G06N 10/00 |

FOREIGN PATENT DOCUMENTS

| | | |
|---|---|---|
| CN | 107239826 A | 10/2017 |
| EP | 3029614 A1 | 6/2016 |

OTHER PUBLICATIONS

Extended European Search Report from European Application No. 18207512.7 dated Apr. 10, 2019.
Extended European Search Report from European Application No. 18211878.6 dated Apr. 29, 2019.
Polyak et al., "Channel-Level Acceleration of Deep Face Representations", IEEE Access, vol. 3, Oct. 2015, pp. 2163-2175 [retrieved on Nov. 17, 2015].
Search Report from corresponding Chinese Application No. 201711163211.7 dated Aug. 25, 2019.

* cited by examiner

300

S301
Selecting a plurality of consecutive layers in the convolutional neural network

S305
determining an expected number of subdata blocks and a layout position, a width and a height of each subdata block in an output feature data of a last layer in the selected layers

S310
determining, for each current layer in the selected layers starting from the last layer, a layout position, a width, and a height of each subdata block of an input feature data for the current layer

S315
determining an actual position of each subdata block of the input feature data for the first layer in the selected layers in the input feature data for the first layer

S320
obtaining the expected number of subdata blocks of the input feature data of the first layer according to the actual position, the width and the height of the subdata block

FIG. 3

METHOD AND APPARATUS FOR ADAPTING FEATURE DATA IN A CONVOLUTIONAL NEURAL NETWORK

CROSS-REFERENCE TO RELATED APPLICATION

This application claims priority to Chinese Application No. 201711163211.7, filed Nov. 21, 2017, titled "METHOD AND APPARATUS FOR ADAPTING FEATURE DATA IN CONVOLUTIONAL NEURAL NETWORK."

TECHNICAL FIELD OF THE DISCLOSURE

The present disclosure relates generally to the technical field of artificial neural networks, and in particular, to a method and an apparatus for adapting feature data in a convolutional neural network.

BACKGROUND

Deep learning technology based on convolutional neural network has already been widely used in various fields such as image recognition, video analysis, natural language processing, auxiliary driving and the like. It is expected that operations in a convolutional neural network may be efficiently performed by using hardware such as a general purpose central processing unit (CPU), a graphics processing unit (GPU), or a dedicated accelerator, and the like.

Data accessing speed is a critical factor affecting the efficiency of operation. In light of this, a high speed memory such as a cache or an on-chip memory may be provided to a processor (e.g., CPU, GPU, or dedicated accelerator) to buffer at least a portion of the data. However, due to limitations from aspects such as costs, the capacity of the high speed memory is usually too limited to buffer all data (e.g., feature data) for layers of the convolutional neural network, resulting in a huge data transportation between the high speed memory and other memories with relatively lower access speed (e.g., a random access memory coupled to the processor via a bus, or a storage coupled to a processor or a computing device including the processor via an interface or a data line, such as a hard disk).

SUMMARY

In an aspect, the present disclosure relates to a method for adapting feature data in a convolutional neural network, comprising the steps of: selecting a plurality of consecutive layers in the convolutional neural network; determining an expected number of subdata blocks and a layout position, a width and a height of each subdata block in an output feature data of a last layer in the plurality of layers; determining, for each current layer in the plurality of layers, a layout position, a width, and a height of each subdata block of an input feature data for the current layer according to the layout position, the width, and the height of each subdata block of the output feature data of the current layer; determining an actual position of each subdata block of the input feature data for a first layer in the plurality of layers in the input feature data for the first layer; and obtaining the expected number of subdata blocks of the input feature data for the first layer according to the actual position, the width and the height of each subdata block of the input feature data for the first layer.

In another aspect, the present disclosure relates to an apparatus for adapting feature data in a convolutional neural network, comprising: a processor configured to execute at least the above method; and a cache configured to cache data involved in operation of the convolutional neural network.

In still another aspect, the present disclosure relates to an apparatus for adapting feature data in a convolutional neural network, comprising: a selector configured to select a plurality of consecutive layers in the convolutional neural network; and a splitter configured to determine an expected number of subdata blocks and a layout position, a width and a height of each subdata block in an output feature data of a last layer in the plurality of layers; determine, for each current layer in plurality of layers, a layout position, a width, and a height of each subdata block of an input feature data for the current layer according to the layout position, the width, and the height of each subdata block of the output feature data for the current layer; determine an actual position of each subdata block of the input feature data for a first layer in the plurality of layers in the input feature data for the first layer; and obtain the expected number of subdata blocks of the input feature data for the first layer according to the actual position, the width and the height of each subdata block of the input feature data for the first layer.

Further, the present disclosure also relates to a non-temporary storage medium with one or more program instructions stored therein for executing at least steps of the above method when being executed by a computing device.

By means of the method and/or apparatus according to the present disclosure, the convolutional operation of the feature data in any size can be efficiently realized while effectively reducing the huge data transportation between an external memory and a processor.

BRIEF DESCRIPTION OF THE DRAWINGS

FIG. 3 illustrates a flow chart of a method for adapting feature data in a convolutional neural network according to an embodiment of the present disclosure.

DETAILED DESCRIPTION

Figure 1:
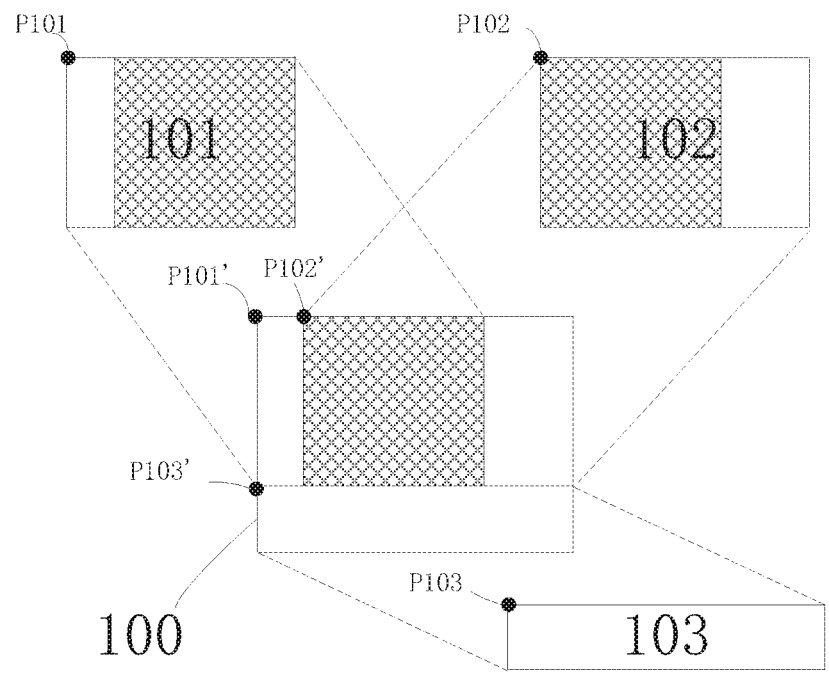
FIG. 1 illustrates an exemplary splitting mode in which feature data is split into three subdata blocks according to an embodiment of the present disclosure.

A convolutional neural network is a multi-layered structure. In each layer of the convolutional neural network, for an input feature data of the layer, parameters relating to the layer are used (e.g., convolution parameters, etc.) to perform operations related to the layer (e.g., convolution operations, etc.), and the obtained output feature data is provided, as an input feature data for the next layer, to the next layer for further processing, or alternatively, in the case where the layer is already the last layer of the convolutional neural network, the obtained output feature data is output as the final processing result for the convolutional neural network. For example, in the case of a residual convolutional neural network, the operations performed on the output feature data for a certain layer may also include performing an element-wise add operation on the output feature data for this layer and the output feature data for additional one or more layers prior to this layer.

Feature data is also known as a feature map, which may be considered as a datablock with a certain width and height. For example, in the case where the feature data or the feature map is an image, the number of columns and the number of rows including pixel values in the image may be considered as width and height of the feature data or the feature map, respectively.

As described above, it can be expected that operations of a convolutional neural network are efficiently performed by using hardware such as CPU, GPU, or a dedicated accelerator, and the like. Accordingly, data access speed is a critical factor affecting the operation efficiency. For this purpose, a high speed memory such as a cache or on-chip memory may be provided for a processor to cache at least a portion of the data (including feature data and related parameters). In addition, in order to efficiently utilize the high speed memory associated with the processor, operation on a plurality of consecutive layers in the convolutional neural network may be performed in, for example, a fusion mode to reduce data transportation during the operation in the convolutional neural network.

However, due to limitations such as costs, the capacity of high speed memory is usually limited. For example, in the case where the amount of an input feature data provided to the convolutional neural network is large, the high speed memory may not be able to completely buffer the data, resulting in a large amount of data transportation, which affects execution efficiency of the operation in the convolutional neural network.

Therefore, in a technical solution according to an embodiment of the present disclosure, an input feature data of a designated layer (for example, the input layer or a layer in the middle of the convolutional neural network) in a convolutional neural network is "split" into multiple subdata. Then, the obtained subdata may be used instead of the original feature data, and each of the obtained subdata can be provided to the designated layer as the input feature data, respectively.

For example, having sufficient number of subdata and/or making the size of each subdata sufficiently small, as needed, for each subdata input, data involved in the operation of each layer from the consecutive layers, beginning from the above designated layer, may be completely buffered in the high speed memory, or even operations in the consecutive layers starting from the designated layer may only use the high speed memory.

The above "splitting" should at least ensure that the result of the final output from the convolutional neural network is not changed. In other words, in the case where each of the obtained subdata is respectively provided, as an input, to the above designated layer, the result obtained by combining (for example, "splicing" or "lapping") the plurality of output subdata obtained from the operations in the consecutive layers should be the same as the output feature data obtained by directly providing the original input feature data before "splitting" to the designated layer and performing the operations in the consecutive layers.

Therefore, in general, the technical solution according to an embodiment of the present disclosure relates to how to determine the splitting mode of an input feature data for the first layer from the consecutive layers based on the expected splitting or dividing mode for the output feature data in the last layer from the consecutive layers in the convolutional neural network, so as to improve the operation efficiency, such as reducing times of data transportation during operation or improving parallelism of operation.

Herein, for convenience, when referring to obtaining a plurality of subdata or subdata blocks of feature data, the term "splitting" or "dividing" is used, wherein "splitting" means that there may be overlapping portion(s) among some subdata blocks, while "dividing" means that there is not any overlapping portion between any two subdata blocks. However, no matter whether it is "splitting" or "dividing", each obtained subdata block is corresponding to data in a certain area of the original feature data, and each subdata block is not identical to any other subdata block. The original feature data may be obtained by, for example, "splicing" (i.e., there is no overlapping between the subdata blocks during combination) or "lapping" (i.e., there may be overlapping among subdata blocks during combination) all of the subdata blocks.

Figure 2:
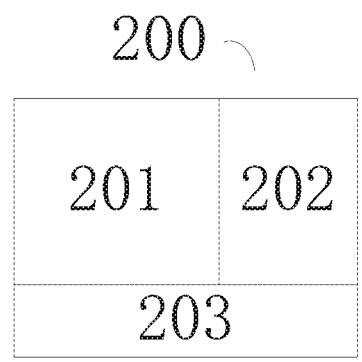
FIG. 2 illustrates an exemplary dividing mode in which feature data is divided into three subdata blocks according to an embodiment of the present disclosure.

FIG. 1 illustrates an exemplary splitting mode in which feature data is split into three subdata blocks according to an embodiment of the present disclosure, wherein feature data 100 is split into three subdata blocks 101, 102, and 103, and subdata block 101 and subdata block 102 have an overlapping portion or overlapping data (as shown in the shadowed portion of FIG. 1). FIG. 2 illustrates an exemplary dividing mode in which feature data is divided into three subdata blocks according to an embodiment of the present disclosure, wherein feature data 200 is divided into three subdata blocks 201, 202, and 203, and there is no overlapping portion or overlapping data between any two subdata blocks.

It should be appreciated that the feature data 100 or 200 may be split or divided into three subdata blocks in a different splitting or dividing mode from the examples shown in FIG. 1 and FIG. 2. Further, although FIG. 1 and FIG. 2 illustrate that the feature data 100 or 200 is split or divided into three subdata blocks, the number of the subdata blocks or expected subdata blocks may also be any other number greater than 1.

As shown in FIG. 1 and FIG. 2, like the original feature data, each subdata block obtained after being split or divided may also have a width and a height, as well as attributes such as a layout position and an actual position.

The layout position of a subdata block may represent the subdata block's position relative to other subdata blocks. In other words, if all the subdata blocks are arranged according to their respective layout positions, and then the subdata blocks are spliced together without overlapping or lapped together with overlapping by keeping the relative layout positions thereof unchanged, the original feature data before being split or divided can be obtained.

In one example, rows and columns may be used to represent layout positions of the subdata blocks. For example, in the example of FIG. 1, the layout position of the subdata block 101 may be the first row and the first column, the layout position of the subdata block 102 may be the first row and the second column, and the subdata block 103 may be the second row.

In another example, a certain subdata block may be used as a reference block, and then the relative positions among the subdata blocks are used to represent the layout positions of the subdata blocks. For example, in the example of FIG. 1, if the layout position of the subdata block 102 is set as the reference position, the layout position of the subdata block 101 may be on the left side of the subdata block 102, and the layout position of the subdata block 103 may be on the lower side of the subdata block 102; if the layout position of the subdata block 103 is set as the reference position, the layout position of the subdata block 101 may be in the upper left of the subdata block 103 or the first column in the upper row, and the layout position of the subdata block 102 may be in the upper right of the subdata block 103 or the second column in the upper row.

In other examples, the relative positions of each subdata block may be numbered or uniquely marked in another form, and the layout positions of each subdata may be identified with corresponding numbers or marks.

In still other examples, the position of a certain data point in a subdata block may be selected to represent the layout position of the data block. For example, in the example of FIG. 1, the positions of the data points P101, P102, and P103 at the upper left corner of each subdata block 101, 102, and 103, respectively, may be selected to represent the layout positions of each subdata block 101, 102, and 103.

It should be appreciated that the arrangement for determining and representing the layout positions of the subdata blocks or the relative positional relationship among the subdata blocks is not limited to the above examples, and the technical solution according to embodiments of the present disclosure is not limited to the arrangement selected for determining and representing the layout positions of the subdata block or the relative positional relationship among the subdata blocks.

The actual position of the subdata block may represent the position or corresponding region of the subdata block in the original feature data. In other words, the actual position of the subdata or subdata block may represent which block of the original feature data the subdata actually corresponds to.

In one example, the position in the original feature data of the data at a certain point in the subdata block may be used as the actual position of the subdata. For example, in the example of FIG. 1, the positions P101', P102', and P103' of the data at the upper left corners P101, P102, and P103 of the subdata blocks 101, 102, and 103, in the original feature data 100, may be used as the actual positions of the subdata blocks 101, 102 and 103, respectively.

In other examples, it is also possible to use the position, corresponding to that in the original feature data, of the reference point (for example, the point at the upper left corner, the center point, etc.) in one subdata block as the origin point, and the offsets between the reference points in the other subdata blocks and the original point are used to determine and represent the actual positions of the other subdata blocks.

It should be appreciated that the arrangement for determining and representing the actual positions of the subdata blocks or which portions of the original feature data the subdata blocks correspond to are not limited to the above examples, and the technical solution according to the embodiments of the present disclosure is also not limited to the arrangement for determining and representing the actual positions of the subdata blocks or which portions of the original feature data the subdata blocks correspond to.

FIG. 3 illustrates a flow chart of an exemplary method 300 for adapting feature data in a convolutional neural network according to an embodiment of the present disclosure.

As shown in FIG. 3, the exemplary method 300 may comprise:

Step S301, selecting a plurality of consecutive layers in the convolutional neural network;

Step S305, determining an expected number of subdata blocks and a layout position, a width and a height of each subdata block in an output feature data of a last layer in the selected layers;

Step S310, determining, for each current layer in the selected layers starting from the last layer, a layout position, a width and a height of each subdata block of an input feature data, until the layout position, the width, and the height of each subdata block of the input feature data for a first layer in the plurality of layers are determined;

Step S315, determining an actual position of each subdata block of the input feature data for the first layer in the selected layers, in the input feature data for the first layer; and Step S320, obtaining the expected number of subdata blocks of the input feature data of the first layer according to the actual position, the width and the height of each subdata block of the input feature data for the first layer.

Details of the steps in the exemplary method 300 will be described as below.

In step S301 of the exemplary method 300, one layer in the convolutional neural network may be firstly selected as a target layer in which the input feature data is to be split; then, beginning from this layer, or using this layer as the first layer, the other one or more layers are continuously selected in the convolutional neural network.

"Continuous selection" means that the data stream in the convolutional neural network will sequentially and continuously pass through the selected consecutive layers in the feedforward direction of the convolutional neural network. Therefore, each selected layer, except the selected first layer, receives an output feature data from the previous layer as the input feature data, and on the other hand, each selected layer, except the selected last layer, provides the output feature data obtained by operation of the layer to the next layer as the input feature data thereto.

Depending on the position where the selected first layer locates in the entire convolutional neural network, the input feature data for the first layer may be the output feature data from the previous layer in the convolutional neural network, or the initial input feature data provided to the entire convolutional neural network. Similarly, depending on the position where the selected last layer locates in the entire convolutional neural network, the output feature data from the last layer may be provided to the next layer in the convolutional neural network, or used as the final output result from the entire convolutional neural network.

The feedforward process of a convolutional neural network may begin from a large piece of feature data. Therefore, in one embodiment, the input layer for the entire convolutional neural network may be selected as the first layer in step S301. In other embodiments, a layer in the middle of the convolutional neural network may be selected as the first layer.

Generally, a suitable convolutional neural network may be designed in advance according to a certain application requirement, including predetermining the number of layers in the convolutional neural network, the operations to be performed for each layer, and the relevant parameters thereof. Thus, for any given input feature data to be provided to a convolutional neural network, the width and height of the input feature data and the width and height of the output feature data, for each layer in the convolutional neural network, and the amount of storage space required for the number of operations involved in this layer, etc. may be determined or known in advance before performing operations in the actual convolutional neural network.

In an embodiment, in step S301, a certain number of consecutive layers may be selected in the feedforward direction of the convolutional neural network beginning from the selected first layer, wherein, the number may be a value calculated by the designer in advance according to experience or statistical data and/or hardware parameters during designing the convolutional neural network, or a random value.

In another embodiment, in step S301, a sum of sizes of the input feature data and related parameters for each layer or an amount of storage space required to store the input feature data and related parameters for the layer may be calculated in sequence, beginning from the selected first layer in the feedforward direction of the convolutional neural network, and a layer with a corresponding calculation result less than or equal to a preset threshold may be selected as the last layer in the consecutive layers.

For example, in the selected consecutive layers, there may be only the last layer for which the above calculation result is less than or equal to the threshold. For example, there may be several layers, including the last layer, either continuous or discontinuous, for each layer of which the above calculation results are less than or equal to the threshold. The above threshold can be predetermined, for example, based on the capacity of the cache used to cache data involved in the operations in the convolutional neural network. For example, the threshold may be set as ¼, ⅓, ⅔, ¾, etc. of the capacity of the cache, or equal to or even greater than the capacity of the cache.

In another embodiment, for example, for a specific application requirement, after designing the corresponding convolutional neural network, the maximum size of the feature data that may be provided to the convolutional neural network can be predicted in advance according to the architecture of the convolutional neural network, application scene or statistical data, hardware configurations for operations in the convolutional neural network, experience of designers, etc. For example, in the application of image recognition, based on the application scene, the expected accuracy for image recognition, and limitations from hardware configurations such as a camera, an image processor, a display, etc., the possible maximum size of the feature data (e.g., the original input image to be conducted image recognition) that may be provided to the convolutional neural network can be determined, and the amount of data that may be involved in the operation in each layer of the convolutional neural network, in the case where the feature data of the possible maximum size is used, can be determined.

For example, a plurality of consecutive layers may be determined when determining the architecture and application scene of the convolutional neural network based on such prediction results. In such a process, for example, the above threshold may be considered. For example, among the determined layers, the possible maximum size of the possible input feature data for each layer in one or more layers including the last layer and the parameters related to the operation of this layer may be less than or equal to the above preset threshold. Then, such layers are selected in step S301 of the exemplary method 300.

In a further embodiment, the plurality of consecutive layers may be determined based on the prediction result as described above in step S301.

In another embodiment, the plurality of consecutive layers may be initially selected based on the prediction result in step S301, then the actual size of the data involved in the operation of the last layer may be determined based on the actual input feature data provided to the convolutional neural network, to adjust (e.g., expand or reduce) the initially selected consecutive layers.

After selecting the consecutive layers in the convolutional neural network in step S301, the exemplary method 300 proceeds to step S305 to determine an expected number of subdata blocks of the output feature data for the last layer of the selected layers and the expected layout position, width, and height of each subdata block.

In one embodiment, in step S305, it may be determined how many blocks the output feature data for the last layer is expected to be split or divided according to the sizes of the input feature data of each layer from the layers selected in step S301.

For example, the expected number of subdata blocks of the output feature data for the last layer may be determined to satisfy the following condition:

$$E > (\max_{1 \leq i \leq N} \{F_i + P_i\})/R,$$

wherein E is the expected number, max is a function that returns a maximum value, N is the number of layers selected in step S301, $F_i$ and $P_i$ are respectively the sizes of the input feature data of the i-th layer in the selected layers and the sizes of the related parameters, and R is a reference value. For example, the reference value R may be set as ¼, ⅓, ⅔, ¾, etc. of the capacity of the high speed memory, to be greater than or equal to the capacity of the high speed memory, or to be a value several times as much as the capacity of the high speed memory.

The expected number of subdata blocks of the output feature data for the last layer may also be determined based on the result obtained by dividing the sum of the sizes of the input feature data and the related parameters for a selected part of or all layers by the reference value R. For example, the expected number may be made greater than or equal to the obtained result.

In addition, in determining the expected number, it may also consider only the size of the input feature data for each layer. For example, in the case where the relevant parameters to the layers are very small compared with the input feature data and/or sufficient storage space has been reserved in the high speed memory for the relevant parameters, the expected number of subdata blocks of the output feature data for the last layer may be determined based on the result obtained by dividing the size of the input feature data for the selected first layer by the reference value R, or by dividing the sum of the sizes of the input feature data and the related parameters for the selected part of or all layers by the reference value R. For example, the expected number may be made greater than or equal to the obtained result.

After determining the expected number of subdata blocks of the output feature data for the last layer, "assumed" splitting or dividing is performed to the output feature data for the last layer in any suitable splitting or dividing manner, so as to determine the layout position, the width and the height of each subdata block in the expected number of subdata blocks of the output feature data for the last layer.

Figure 4:
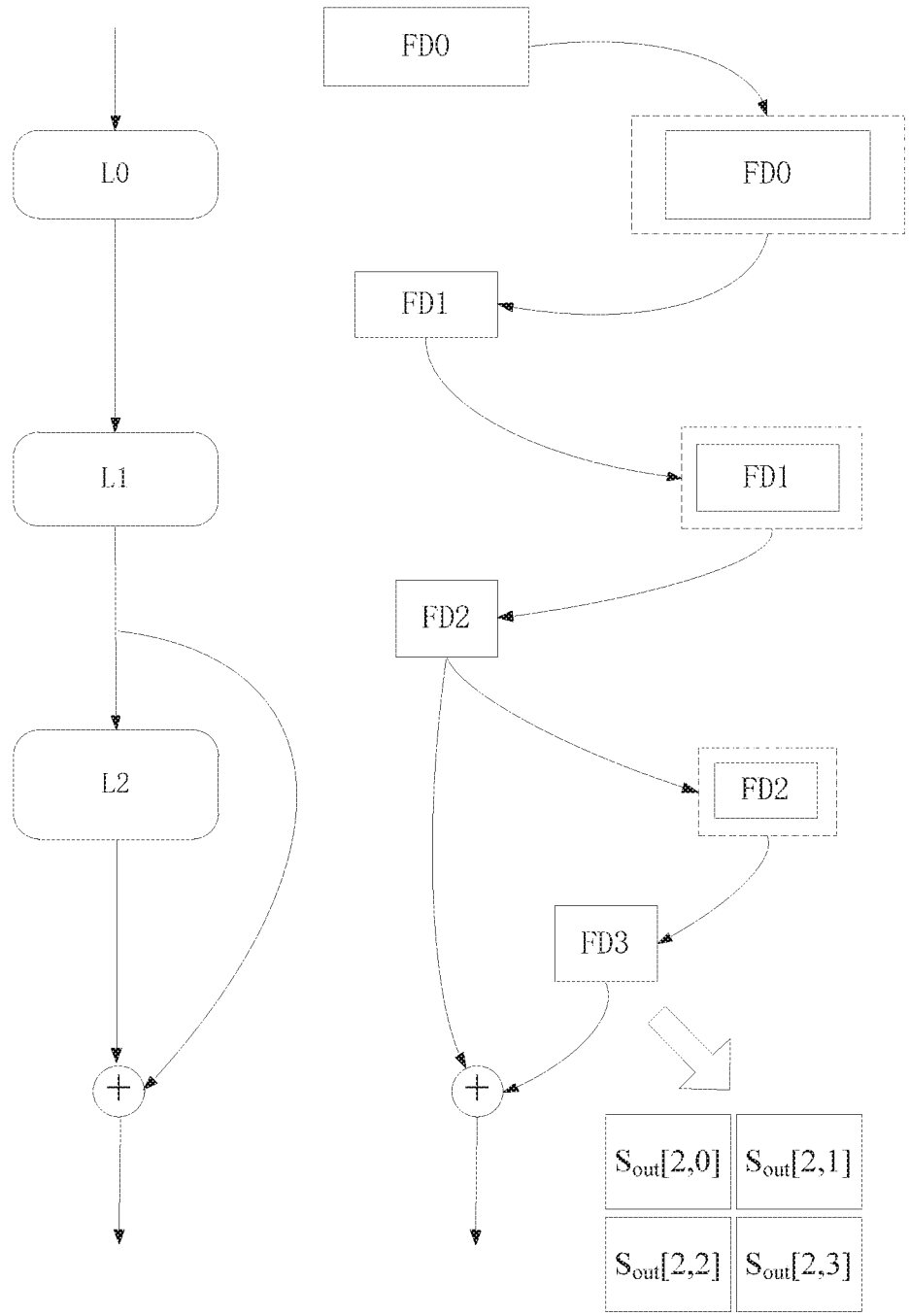
FIG. 4 illustrates an example of determining a layout position, a width, and a height of a subdata block of an output feature data for the last layer according to an embodiment of the present disclosure.

FIG. 4 illustrates an example of determining a layout position, a width, and a height of a subdata block of an output feature data for a last layer according to an embodiment of the present disclosure. The left part of FIG. 4 shows selecting three consecutive layers L0 to L2 in the convolutional neural network in step S301. The right part of FIG. 4 shows the data flow for the three consecutive layers on the left part of FIG. 4, wherein the feature data FD0 is the input feature data to the layer L0, the feature data FD1 is the output feature data from the layer L0 and the input feature data to the layer L1, FD2 is the output feature data from the layer L1 and the input feature data to the layer L2, FD3 is the output feature data from the layer L2, and it is necessary to perform an elementwise add operation on FD2 and FD3. Further, for each feature data in the example of FIG. 4, a solid line frame represents an actual data portion of each feature data, and the portion between a dashed line frame and a solid line frame represents a possible padding on each feature data.

It should be appreciated that the plurality of layers selected in step S301 are not limited to the example shown in FIG. 4, but they may include other numbers of layers, and may not be executed in an elementwise add operation, or may be executed in additional elementwise add operations between additional multiple output feature data or sets of output feature data from the selected layers.

It should also be appreciated that the dashed line frame is shown as enclosing the entire feature data in FIG. 4, but this does not mean that the periphery of the feature data must be padded in the operation on the corresponding layer, however, any one or more of the left side, right side, upper side, and lower side of the feature data may be padded as needed, or even may not be padded. If padding is not performed in the direction of one of the left side, right side, upper side, and lower side of the feature data, the padding quantity (i.e. the number of padded rows or columns) in that direction may be recorded as 0, in other words, a padding quantity of 0 is performed in that direction.

In the example of FIG. 4, the expected number of subdata blocks for the feature data FD3 is determined as 4 in step S305, and it is assumed that FD3 is arbitrarily divided into three rows and three columns by two horizontal straight lines and two vertical straight lines, and layout positions of the four expected subdata blocks are recorded as 0 to 3, respectively. Thus, the width and height of each subdata block may be determined according to the width and the height of the feature data FD3 and the assumed dividing manner, respectively, wherein $W_0=W_2$, $W_1=W_3$, $W_0+W_1=W_{FD3}$, $H_0=H_1$, $H_2=H_3$, $H_0+H_2=H_{FD3}$, $W_0$ to $W_3$ and $W_{FD3}$ represent the width of subdata blocks at the layout positions 0 to 4 of FD3 and the width of FD3, respectively, and $H_0$ to $H_3$ and $H_{FD3}$ represent the height of subdata blocks at the layout positions 0 to 3 of FD3 and the height of FD3, respectively.

It should be appreciated that the dividing manner of dividing FD3 into 4 subdata blocks shown in FIG. 4 is only an example. Any other splitting manner or dividing manner may be selected, accordingly the layout position, width and height of each subdata block may be determined. For example, the expected dividing manner for FD3 may be horizontally dividing FD3 into 4 subdata blocks, wherein the height of each subdata block may be identical or different. For example, the expected dividing manner for FD3 may firstly horizontally divide FD3 into two portions, then one portion is made to be one subdata block, and the other portion is vertically divided into three subdata blocks. For example, the expected splitting manner for FD3 may be vertically splitting FD3 into 4 subdata blocks, wherein the width of each subdata block may be identical or different. For example, the expected splitting manner for FD3 may be firstly horizontally dividing FD3 into two portions, and then one portion is made to be one subdata block, and the other portion is vertically split into three subdata blocks.

In other embodiments, the expected layout position, width and height of each subdata block from the output feature data for the last layer may also be firstly determined, and then the number of all subdata is counted as the expected number of subdata blocks.

For example, a threshold may be set, and then a "hypothetical" dividing may be performed on the output feature data from the last layer, such that the size of each subdata block obtained by the "hypothetical" dividing is less than or equal to the set threshold. For example, the output feature data of the last layer may be "hypothetically" divided into two portions, and then the portions whose size is larger than the threshold are continuously divided, until the size of all obtained subdata blocks is less than or equal to the set threshold. For example, one subdata block may also be "hypothetically" divided from the output feature data in the last layer, such that the size of subdata block is less than or equal to the set threshold; if the size of the remaining portion is still greater than the threshold, then the other subdata are continuously divided from the remaining portion and such that the size of the new subdata block is less than or equal to the set threshold; then the number of all subdata is counted as the expected number of subdata blocks.

In this embodiment, for example, it may be assumed that certain feature data with a size less than the reference value R is provided to the first layer of the selected layers, and the size S of the output feature data output after operation in the plurality of layers is determined, and then S may be used as the threshold in this embodiment. For example, the reference value R may be set as ¼, ⅓, ⅔, ¾, etc. of the capacity of the high speed memory, or the reference value R may also be set to be greater than or equal to the capacity of the high speed memory, and the reference value R may also be set as several times as much as the capacity of the high speed memory. In other examples, the reference value R may also be set as $a*M-P_{max}$, wherein M is the capacity of the high speed memory, a is a coefficient greater than 0, and $P_{max}$ is the size of related parameters of the layer with the largest size of related parameters in the selected layers.

After the expected number of subdata blocks from the output feature data for the last layer in the selected layers and the layout position, width and height of each subdata block are determined in step S305, the method 300 proceeds to step S310 to determine the layout position, the width and the height of each subdata block from the input feature data for that layer according to the layout position, width and height of each subdata block from the output feature data for that layer, respectively, in each selected layer.

In one embodiment, for example, the width and height of each subdata block from the input feature data for each layer may be inversely derived layer by layer from the last layer based on the layout position, width and height of each subdata block from the output feature data for the last layer determined in step S305, until the layout position, the width and the height of each subdata block of the subdata block from the input feature data for the first layer are obtained.

For convenience, the first layer of the selected N layers is recorded as the 0-th layer, and the last layer is recorded as the (N−1)th layer. For a designed convolutional neural network, the width and height of the kernel of the relevant parameters used in each layer, the stride of the kernel of the related parameters in each layer in the width and height direction, and the padding manner for each layer of data (including the padding quantity on the right side, left side, upper side, and lower side) may be known. Then, in each i (0<=i<N)-th layer, the width $WS_{in}[i,j]$ and height $HS_{in}[i,j]$ of the subdata blocks $S_{in}[i,j]$ from the input feature data $FD_{in}[i]$ for this layer (e.g., FD1 in FIG. 4 corresponds to $FD_{in}[0]$) at the layout position j (0<=j<E, E is the expected number of subdata blocks) may be determined according to the following equations, respectively:

$$WS_{in}[i,j]=(WS_{out}[i,j]-1)*W_S[i]+W_K[i]-P_R[i]-P_L[i] \quad \text{(equation 1)},$$

$$HS_{in}[i,j]=(HS_{out}[i,j]-1)*H_S[i]+H_K[i]-P_U[i]-P_D[i] \quad \text{(equation 2)},$$

wherein $WS_{out}[i,j]$ and $HS_{out}[i,j]$ respectively represent the width and height of the subdata block of the output feature data $FD_{out}[i]$ for the i-th layer at the layout position j; $W_S[i]$ and $H_S[i]$ respectively represent the stride of the kernel of the related parameters for the operation in the i-th layer in the width and height directions; $W_K[i]$ and $H_K[i]$ respectively represent the width and height of the kernel (e.g., convolution kernel for convolution operation or pooling kernel for pooling operation) on the related parameters for the operation in the i-th layer, and $P_R[i]$, $P_L[i]$, $P_U[i]$, and $P_D[i]$ respectively represent the padding quantity on the right side, the left side, the upper side, and the lower side for the subdata block $S_{in}[i,j]$ during the operation in the i-th layer.

Regarding $P_R[i]$, $P_L[i]$, $P_U[i]$, and $P_D[i]$, if a certain boundary of the subdata block $S_{in}[i,j]$ is in the input feature data $FD_{in}[i]$, the padding quantity for the subdata block $S_{in}[i,j]$ on the side where the boundary is located is 0; if a certain boundary of the subdata block $S_{in}[i,j]$ corresponds to a certain boundary of the input feature data $FD_{in}[i]$ or a portion of a certain boundary, the padding quantity for the subdata block $S_{in}[i,j]$ on the side where this boundary is located is the padding quantity for the input feature data $FD_{in}[i]$ on the side where this boundary is located.

For a plurality of consecutive layers in a convolutional neural network, inherently, calculating the width and height of a certain subdata of an input feature data for a layer corresponds to calculating the width and height of a subdata with the same layout position of an output feature data for the previous layer. For example, in the example of FIG. 4, L1 and L2 represent two consecutive layers, and FD2 represents both $FD_{in}[2]$ (i.e., the input feature data of the layer L2) and $FD_{out}[1]$ (i.e., the output feature data for the layer L1), so $S_{in}[2,0]$ and $S_{out}[1,0]$ both correspond to the subdata block at the upper left corner of FD2, and $WS_{in}[2,0]=WS_{out}[1,0]$ and $HS_{in}[2,0]=HS_{out}[1,0]$.

For example, it is assumed that the kernel settings of the related parameters of L0 to L2 layers in FIG. 4 are respectively shown in the following Table 1:

TABLE 1

| Layer | Width and height of kernel | Stride on width and height |
|---|---|---|
| L0 | 3 and 3, respectively | 2 and 2, respectively |
| L1 | 5 and 5, respectively | 2 and 2, respectively |
| L2 | 3 and 3, respectively | 1 and 1, respectively |

Thus, according to the design of convolutional neural network, for the input feature data FD0 from L0 layer with a width and height of 20 and 20, respectively, it is clear that:

TABLE 2

| Layer | Padding for an input feature data | Width and height of an output feature data |
|---|---|---|
| L0 | 1 column and 1 row are padded on the left side and upper side of FD0, respectively, while the padding quantity on both of the right side and lower side of FD0 is 0 | Width and height of FD1 are 10 and 10, respectively |
| L1 | 1 column and 1 row are padded on the left side and upper side of FD1, respectively, while the padding quantity on both of the right side and lower side of FD1 is 0 | Width and height of FD2 are 4 and 4, respectively |
| L2 | 1 column is padded on the left side and right side of FD2, respectively, and 1 column and 1 row are padded on the upper side and lower side of FD2, respectively | Width and height of FD3 are 4 and 4, respectively |

Further, assuming that the feature data FD3 is divided into four subdata blocks $S_{out}[2,0]$, $S_{out}[2,1]$, $S_{out}[2,2]$, and $S_{out}[2,3]$ as shown in FIG. 4, and the width and height of each sub-block are 2 and 2, respectively, then the width of each subdata block of the input feature data FD0 from the layer L0 may be inversely derived based on the layout position, the width and the height of each subdata block from FD3 using the above mentioned equations 1 and 2, as shown in the following table 3.

TABLE 3

| | Output subdata block | | | Input subdata block | | |
|---|---|---|---|---|---|---|
| Layer | Layout position | Width | Height | Layout position | Width | Height |
| L2 | upper left corner | 2 | 2 | upper left corner | (2 − 1)*1 + 3 − 1 − 0 = 3 | (2 − 1)* 1 + 3 − 1 − 0 = 3 |
| | upper right corner | 2 | 2 | upper right corner | (2 − 1)*1 + 3 − 0 − 1 = 3 | (2 − 1)*1 + 3 − 1 − 0 = 3 |
| | lower left corner | 2 | 2 | lower left corner | (2 − 1)*1 + 3 − 1 − 0 = 3 | (2 − 1)*1 + 3 − 0 − 1 = 3 |
| | lower right corner | 2 | 2 | lower right corner | (2 − 1)*1 + 3 − 0 − 1 = 3 | (2 − 1)*1 + 3 − 0 − 1 = 3 |
| L1 | upper left corner | 3 | 3 | upper left corner | (3 − 1)*2 + 5 − 1 − 0 = 8 | (3 − 1)*2 + 5 − 1 − 0 = 8 |
| | upper right corner | 3 | 3 | upper right corner | (3 − 1)*2 + 5 − 0 − 0 = 9 | (3 − 1)*2 + 5 − 1 − 0 = 8 |
| | lower left corner | 3 | 3 | lower left corner | (3 − 1)*2 + 5 − 1 − 0 = 8 | (3 − 1)*2 + 5 − 0 − 0 = 9 |
| | lower right corner | 3 | 3 | lower right corner | (3 − 1)*2 + 5 − 0 − 0 = 9 | (3 − 1 )*2 + 5 − 0 − 0 = 9 |

TABLE 3-continued

| | Output subdata block | | | Input subdata block | | |
|---|---|---|---|---|---|---|
| Layer | Layout position | Width | Height | Layout position | Width | Height |
| L0 | upper left corner | 8 | 8 | upper left corner | $(8-1)*2 + 3 - 1 - 0 = 16$ | $(8-1)*2 + 3 - 1 - 0 = 16$ |
| | upper right corner | 9 | 8 | upper right corner | $(9-1)*2 + 3 - 0 - 0 = 19$ | $(8-1)*2 + 3 - 1 - 0 = 16$ |
| | lower left corner | 8 | 9 | lower left corner | $(8-1)*2 + 3 - 1 - 0 = 16$ | $(9-1)*2 + 3 - 0 - 0 = 19$ |
| | lower right corner | 9 | 9 | lower right corner | $(9-1)*2 + 3 - 0 - 0 = 19$ | $(9-1)*2 + 3 - 0 - 0 = 19$ |

In light of this, for FD0 with a width and height of 20 and 20, respectively, in the example of FIG. 4, in the case where FD3 is expected to be divided into four subdata blocks with a width and height of 2 and 2, FD0 needs to be divided into four subdata blocks of 16×16, 19×16, 16×19 and 19×19.

As described above, by step S310, the layout position, width, and height of each subdata block from the input feature data for the first layer may be finally obtained. Then the exemplary method 300 proceeds to step S315 to determine the actual position of each subdata block from the input feature data for the first layer in the input feature data of this first layer.

In one embodiment, the width and height of the overlapping portion among each subdata block from the input feature data for the first layer may be determined, and then the actual position of each subdata block in the input feature data for this first layer may be determined based on the height and the width of the overlapping portion, the width and the height of each subdata block, and the height and the width of the input feature data for the first layer.

In one embodiment, each subdata block of the first layer can be considered to be a form being capable of constituting a subdata blocks array including one or more rows and one or more columns according to the layout position of each subdata block for the first layer, wherein each row contains the same number of subdata blocks and the height of the subdata blocks of each row is identical, and each column contains the same number of subdata blocks and the width of the subdata blocks of each column is identical. Then, the width WO of the overlapping portion in the width direction and the height HO of the overlapping portion in the height direction between any two adjacent subdata blocks may be calculated based on the following equations:

$$WO = ((\Sigma_{i=0}^{E=0} WS_{in}[0,i])/R - WFD_{in}[0])/(C0) \quad \text{(equation 3)},$$

$$HO = ((\Sigma_{i=0}^{E=0} HS_{in}[0,i])/C - HFD_{in}[0])/(R0) \quad \text{(equation 4)},$$

wherein E is the expected number of subdata blocks; $WS_{in}[0,i]$ and $HS_{in}[0,i]$ respectively represent the width and height of the i-th subdata block from the input feature data $FD_{in}[0]$ for the first layer, $WFD_{in}[0]$ and $HFD_{in}[0]$ respectively represent the width and height of the input feature data $FD_{in}[0]$ for the first layer, R and C respectively represent the number of rows and the number of columns of the subdata block array constituted by all the subdata blocks $S_{in}[0,i]$ (0<=i<E) of $FD_{in}[0]$.

Figure 5:
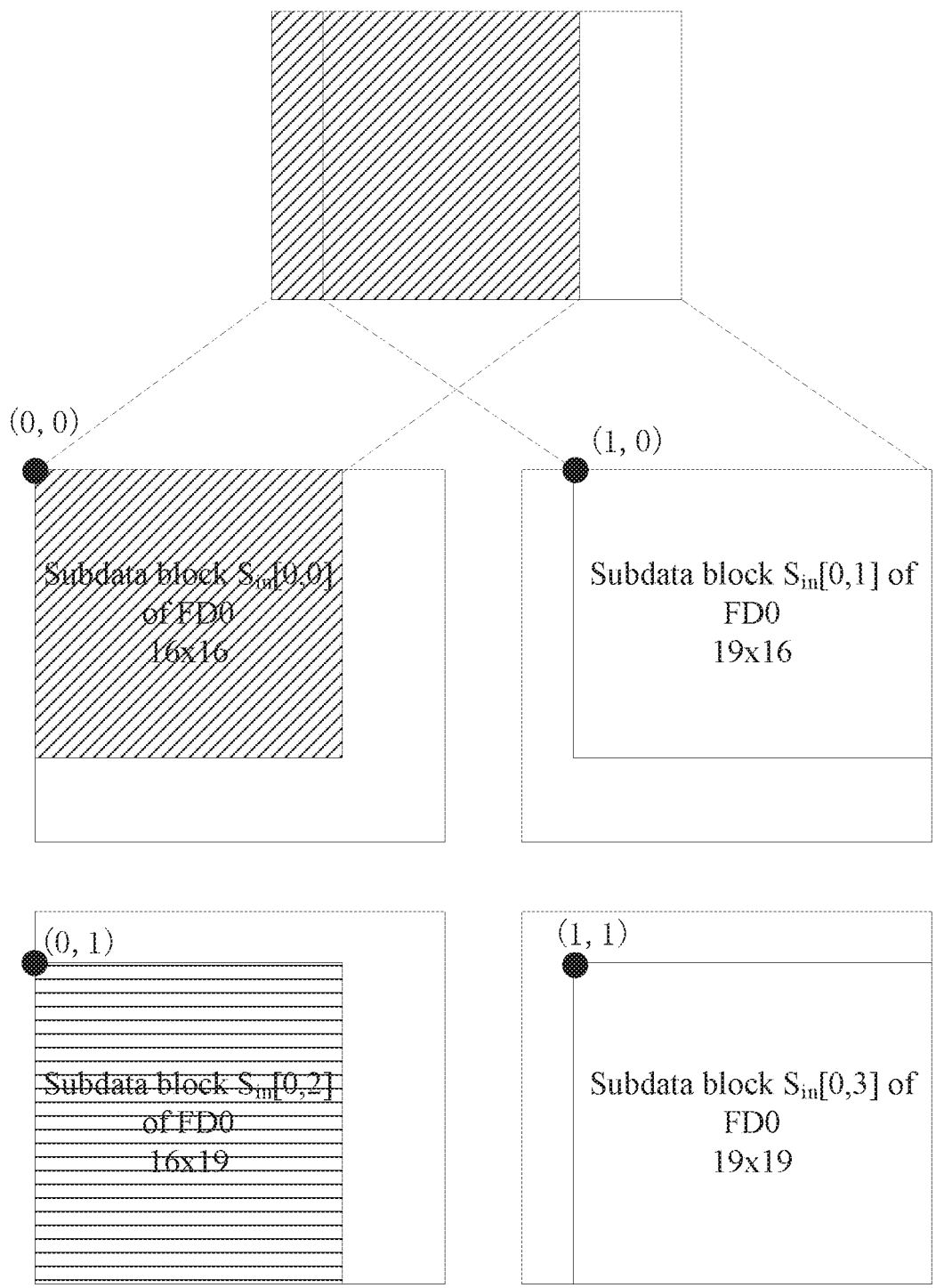
FIG. 5 illustrates an example of determining an actual position of a subdata block of an input feature data for the first layer according to an embodiment of the present disclosure.

FIG. 5 illustrates an example of determining the actual position of each subdata block from FD0 in the example of FIG. 4. As shown in FIG. 5, overlapping portions exist among each subdata block from FD0. According to the above equations 3 and 4, it may be determined that the width of the overlapping portion between $S_{in}[0,0]$ and $S_{in}[0,1]$ in the example of FIG. 5 is $WO=((16+19+16+19)/2-20)/(2-1)=15$, and the height of the overlapping portion between $S_{in}[0,0]$ and $S_{in}[0,2]$ is $HO=((16+16+19+19)/2-20)/(2-1)=15$.

Further, the above equation 3 may be simplified to calculate the width of the overlapping portion based on only one row (e.g., the 0-th row in the subdata block array, for example, $S_{in}[0,0]$ and $S_{in}[0,1]$ in the example of FIG. 5), and the above equation 4 may be simplified to calculate the height of the overlapping portion based on only one column (e.g., the 0-th column in the subdata block array, for example, $S_{in}[0,0]$ and $S_{in}[0,2]$ in the example of FIG. 5), respectively as follows:

$$WO = (\Sigma_{j=0}^{C=0} WS_{in\_o}[j] - WFD_{in}[0])/(C0) \quad \text{(equation 5)},$$

$$HO = (\Sigma_{j=0}^{R=0} HS_{in\_o}[j] - HFD_{in}[0])/(R0) \quad \text{(equation 6)},$$

wherein $WS_{in\_o}[j]$ represents the width of the subdata block from the 0-th row and the j-th column of the input feature data $FD_{in}[0]$ for the first layer, and $HS_{in\_o}[j]$ represents the height of the subdata block from the 0-th row of the 0-th column of the input feature data $FD_{in}[0]$ for the first layer.

According to the above equations 5 and 6, it may be determined that the width of the overlapping portion between $S_{in}[0,0]$ and $S_{in}[0,1]$ in the example of FIG. 5 is $WO=(16+19-20)/(2-1)=15$, and the height of the overlapping portion between $S_{in}[0,0]$ and $S_{in}[0,2]$ is $HO=(16+19-20)/(2-1)=15$.

In another embodiment, the width and height of the overlapping portion or overlapping data in each subdata block for each layer overlapping with other adjacent subdata blocks may be calculated layer by layer in reverse from the last layer, and the width and height of each overlapping portion included in each subdata block from the input feature data for the first layer are finally derived.

For example, for a certain boundary (for example, the left side boundary, the right side boundary, the upper side boundary, or the lower side boundary) of the subdata block $S_{in}[i,j]$ from the $FD_{in}[i]$ for the i-th layer at the layout position j (0<=j<E, E is the expected number of subdata blocks) being in $FD_{in}[i]$, it may be determined that $S_{in}[i,j]$ contains overlapping portions or overlapping data on the side where the boundary is located.

If the left side of the subdata block $S_{in}[i,j]$ is in $FD_{in}[i]$, the width and height of the overlapping portion or overlapping data contained on the left side of the subdata block $S_{in}[i,j]$ may be determined based on the following equations 7 and 8:

$$WLO_{in}[i,j] = WLO_{out}[i,j] * W_S[i] + (W_K[i] - W_S[i]) \quad \text{(equation 7)},$$

$$HLO_{in}[i,j] = HS_{in}[i,j] \quad \text{(equation 8)}.$$

Similarly, if the right side of the subdata block $S_{in}[i,j]$ is in $FD_{in}[i]$, the width and height of the overlapping portion or overlapping data contained on the left side of the subdata block $S_{in}[i,j]$ may be determined based on the following equations 9 and 10:

$$WRO_{in}[i,j] = WRO_{out}[i,j] * W_S[i] + (W_K[i] - W_S[i]) \quad \text{(equation 9)},$$

$$HRO_{in}[i,j] = HS_{in}[i,j] \quad \text{(equation 10)}.$$

Similarly, if the upper side of the subdata block $S_{in}[i,j]$ is in $FD_{in}[i]$, the width and height of the overlapping portion or overlapping data contained on the upper side of the subdata block $S_{in}[i,j]$ may be determined based on the following equations 11 and 12:

$$WUO_{in}[i,j]=WS_{in}[i,j] \quad \text{(equation 11)},$$

$$HUO_{in}[i,j]=HUO_{out}[i,j]*H_S[i]+(H_K[i]-H_S[i]) \quad \text{(equation 12)}.$$

Similarly, if the lower side of subdata block $S_{in}[i,j]$ is in $FD_{in}[i]$, the width and the height of the overlapping portion or overlapping data contained on the lower side of the subdata block $S_{in}[i,j]$ may be determined based on the following equations 13 and 14:

$$WDO_{in}[i,j]=WS_{in}[i,j] \quad \text{(equation 13)},$$

$$HDO_{in}[i,j]=HDO_{out}[i,j]*H_S[i]+(H_K[i]-H_S[i]) \quad \text{(equation 14)}.$$

In the above equations 7 to 14, $WLO_{in}[i,j]$, $WRO_{in}[i,j]$, $WUO_{in}[i,j]$, $WDO_{in}[i,j]$, and $HLO_{in}[i,j]$, $HRO_{in}[i,j]$, $HUO_{in}[i,j]$, $HDO_{in}[i,j]$ respectively represent the width and the height of the overlapping portion or overlapping data included in the subdata block $S_{in}[i,j]$ from the input feature data $FD_{in}[i]$ for the i-th layer at the layout position j on the left side, right side, upper side, and lower side; $W_S[i]$ and $H_S[i]$ respectively represent the stride in width and height directions of the operation in the i-th layer, and $W_K[i]$ and $H_K[i]$ respectively represent the kernel on the related parameters for the operation in the i-th layer.

Therefore, the width and the height of the overlapping portion or overlapped data included in each of subdata blocks from the input feature data for the first layer may be derived.

For example, for $S_{in}[0,0]$ in the examples shown in FIG. 4 and FIG. 5, its right side and lower side are in FD0, thereby it may be determined that the right side and the lower side of $S_{in}[0,0]$ include overlapping portions. For example, the width of the overlapping portion included on the right side of $S_{in}[0,0]$ can be calculated as shown in the following Table 4 by equation 9:

TABLE 4

| Layer | The width of overlapping portion of the right side of subdata block $S_{in}[i, 0]$ |
|---|---|
| L2 | $S_{in}[2, 0] = 0*1 + (3 - 1) = 2$ |
| L1 | $S_{in}[1, 0] = 2*2 + (5 - 2) = 7$ |
| L0 | $S_{in}[0, 0] = 7*2 + (3 - 2) = 15$ |

In one embodiment, during determining the layout position, the width and the height of each subdata block from the input feature data for each layer (e.g., in the above step S310), the width and the height of the overlapping portion or overlapping data in each subdata block for each layer possibly overlapped with other adjacent subdata blocks may be calculated layer by layer by using the above equations 7 to 14, then in step S315, the width and the height of each overlapping portion in each subdata block from the input feature data for the first layer calculated in the previous step are directly used.

After obtaining the overlapping width and the overlapping height of the overlapping portion between any two adjacent subdata blocks from the input feature data for the first layer or the overlapping width and the overlapping height of the overlapping portion included in each subdata block, the actual position of each subdata block in the input feature data for the first layer may be determined based on the layout position, width and height of each subdata block and the overlapping width and the overlapping height of the overlapping portion among the subdata blocks.

For example, for any subdata block from the input feature data for the first layer, if it may be determined that there are no other subdata blocks on the left side or the upper side of the subdata block according to its layout position, the actual position of the subdata block may be determined to be located at the upper left corner of the input feature data for the first layer; if it is determined that one or more subdata blocks exist on the left side of the subdata block, the actual position of the subdata block depends on the width and the overlapping width of each data block on the left side of the subdata block; and if it is determined that one or more subdata blocks exist on the upper side of the subdata block, the actual position of the subdata block depends on the height and the overlapping height of each data block on the upper side of the subdata block.

In one embodiment, as described above, the actual position of this subdata may be represented by a position in the input feature data for the first layer which is corresponding with the data in the point at the most upper left corner of the subdata block. For example, referring to the example of FIG. 5, it is assumed that the feature data and each data in each subdata block are regarded as one data point, and the position of the small box at the most upper left corner in the input feature data (for example, FD0 in FIG. 4) for the first layer is set as the original point, further (0,0) is used to represent the coordinates corresponding to the original point. Accordingly, the actual position of each subdata block from the input feature data for the first layer may be determined as follows:

$$x[0]=0, y[0]=0,$$

$$x[k]=\Sigma_{i=0}^{M}(WS[i]-WRO[i]), y[k]=\Sigma_{i=0}^{K}(HS[i]-HUO[i]),$$

wherein (x[k], y[k]) represents the coordinates of the actual position of the subdata block S[k] at the layout position k in the input feature data for the first layer, wherein $0<=k<E$, E is the expected number of subdata blocks from the input feature data for the first layer; M represents the number of subdata blocks whose layout position is located on the left side of S[k], N represents the number of subdata blocks whose layout position is located on the upper side of subdata block S[k], WS[i] and WRO[i] respectively represent the width of the i-th subdata block located on the left side of the subdata block S[k] and the width of the overlapping data included on the right side of the i-th subdata block, and HS[i] and HUO[i] respectively represent the height of the i-th subdata block located on the upper side of the subdata block S[k] and the height of the overlapping data included on the upper side of the i-th subdata block.

For example, in the example of FIG. 5, for the subdata block $S_{in}[0,3]$, it may be determined that one subdata block $S_{in}[0,2]$ exists on the left side of the subdata block $S_{in}[0,3]$, and a subdata block $S_{in}[0,1]$ exists on the upper side of the subdata block $S_{in}[0,3]$, and then the coordinates (x[3], y[3]) of the subdata block $S_{in}[0,3]$ may be determined as x[3]= 16−15=1 and y[3]=16−15=1.

In other embodiments, if each subdata block for the first layer may be considered to be a form being capable of constituting a subdata blocks array (e.g., matrix) including one or more rows and one or more columns, then based on the results calculated by the above equations 11 and 12, the actual position of each subdata block from the input feature data for the first layer may be determined in the following manner:

$x[0]=0, y[0]=0,$ $x[k]=\Sigma_{i=0}^{M}(WS[i]-WO), y[k]=\Sigma_{i=0}^{K}(HS[i]-HO).$ After determining the actual position of each subdata block from the input feature data for the first layer, the method 300 proceeds to step S320 to obtain an expected number of subdata blocks from the input feature data for the first layer, in other words, the input feature data for the first layer is split into an expected number of subdata blocks. In some embodiments, the obtained each subdata block may be stored in a cache for the convolutional operation of the first layer.

For example, in the example of FIG. 5, for subdata blocks $S_{in}[0,0]$, $S_{in}[0,1]$, $S_{in}[0,2]$, and $S_{in}[0,3]$ from FD1, at least the data shown in Table 5 below may be obtained by the steps preceding step S320.

TABLE 5

| Subdata block | Layout position | Width | Height | Actual position |
|---|---|---|---|---|
| $S_{in}[0, 0]$ | 0 | 16 | 16 | (0, 0) |
| $S_{in}[0, 1]$ | 1 | 19 | 16 | (0, 1) |
| $S_{in}[0, 2]$ | 2 | 16 | 19 | (1, 0) |
| $S_{in}[0, 3]$ | 3 | 19 | 19 | (1, 1) |

Accordingly, based on the width, height and actual position of the subdata block, it may be determined which area or data in FD0 corresponds to each subdata block, such that FD0 may be actually split into four (expected number) subdata blocks.

It will be recognized that a convolutional neural network with regular shape attributes is used as an example to describe the exemplary method 300 in the above description. For example, in the examples of FIG. 1, FIG. 2, FIG. 4, and FIG. 5, each feature data, the kernels of the related parameters, and each subdata block are in a regular rectangular shape, such that they may have attributes of width and height. However, it should be appreciated that for irregular convolutional neural networks (i.e., the kernel of the feature data and/or related parameters is other shapes other than a rectangle), the exemplary method 300 may be similarly applied. For example, the irregular feature data and/or parameter kernel may be converted into regular forms by interpolation or padding, and then the method 300 is applied to split the feature data.

Figure 6:
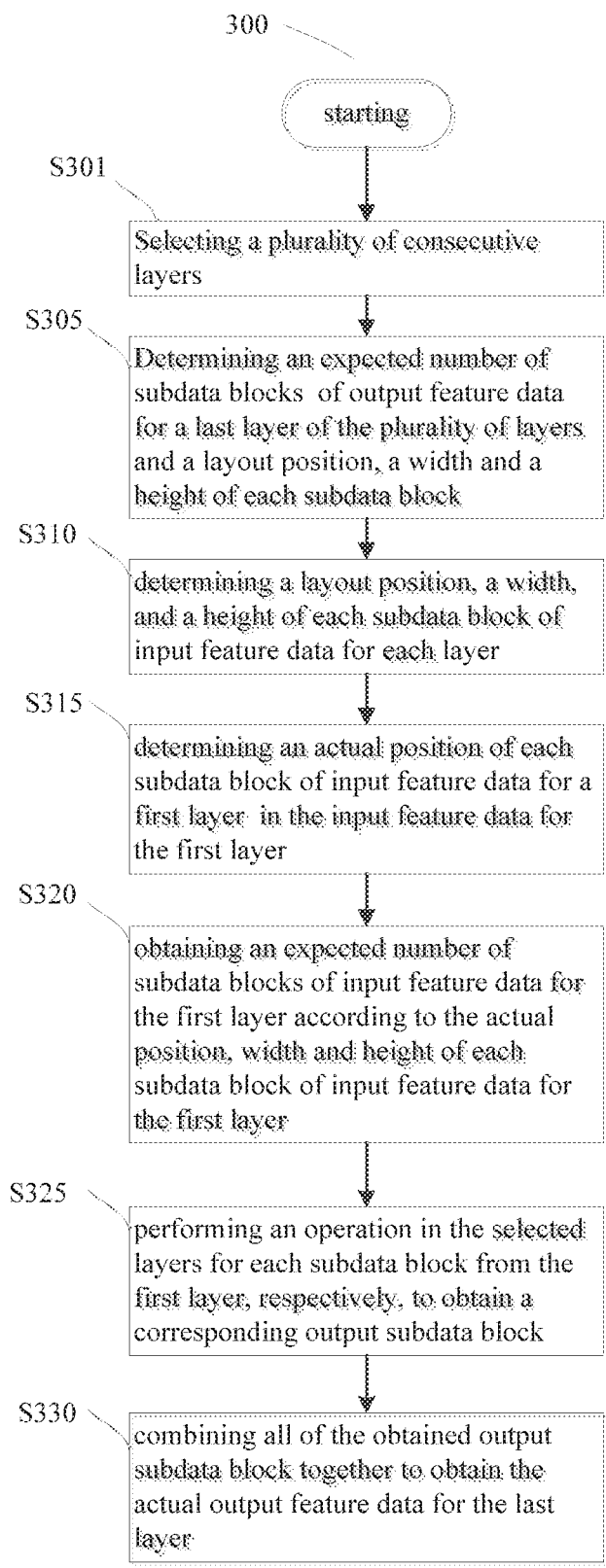
FIG. 6 illustrates a flow chart of a method for adapting feature data in a convolutional neural network according to an embodiment of the present disclosure.

After splitting the input feature data for the first layer into a plurality of subdata blocks, as shown in FIG. 6, the exemplary method 300 may further include:

Step S325, performing an operation in the plurality of layers selected in step S301 for each subdata block from the first layer, respectively, to obtain a corresponding output subdata block; and Step S330, combining all of the obtained output subdata block together to obtain the actual output feature data for the last layer.

In one embodiment, for each subdata block from the input feature data for the first layer, step S325 may be implemented in a serial manner, for example, all subdata blocks from the input feature data for the first layer are sequentially processed in one process or thread.

In another embodiment, for each subdata block from the input feature data for the first layer, step S325 may be implemented in a parallel manner, for example, a plurality of processes or threads may be used, and one subdata block from the input feature data for the first layer may be processed in each process or thread.

Further, as shown in FIG. 4, in the operation in the selected layers, an elementwise add operation (for example, in the case of a residual convolutional neural network) may exist for the output feature data from the two layers in the selected layers. Accordingly, step S325 may further include performing the elementwise add operation on the output feature data for the two layers (for example, the L1 layer and the L2 layer in the example of FIG. 4).

In order to correctly execute the elementwise add operation, it is necessary to determine the actual data range for the elementwise add operation in each subdata block from the output feature data for each of the two layers. The position, width, and height of the repeatedly calculated data in each subdata block may be determined for each subdata block from the output feature data for each layer. Then, the portion obtained after removing repeatedly calculated data from each subdata block may be used as the actual data range of each subdata block.

It should be noted that the two layers to be performed elementwise add operation on their output feature data are not necessarily two consecutive layers. Further, the later layer of the two layers may be the last layer of the selected layers, or may be an intermediate layer in the selected layers like the earlier layer of the two layers.

In an embodiment, the repeatedly calculated data in each subdata block of the output feature data for the last layer of the selected layers may be initially set as 0, and then the position, width and height of the repeatedly calculated data in each subdata block of the input feature data for each layer are inversely derived layer by layer beginning from the last layer of the selected layers.

If the left boundary of the subdata block $S_{in}[i,j]$ from the input feature data $FD_{in}[i]$ for the i-th layer at the layout position j ($0<=j<E$, E is the expected number of subdata blocks) is in $FD_{in}[i]$, it may be determined that $S_{in}[i,j]$ includes repeatedly calculated data $RLD_{in}[i,j,0]$ with a height of $HS_{in}[i,j]$ on the left side, and the width of $RLD_{in}[i,j,0]$ is $|W_K[i]/2|$, wherein $W_K[i]$ represents the width of the kernel of the related parameters used for the operation in the i-th layer, $HS_{in}[i,j]$ represents the height of $S_{in}[i,j]$, and $\|$ represents the rounding operation.

If k+1 repeatedly calculated data $RLD_{out}[i,j,k]$, $k>=0$ are included on the left side of the subdata block $S_{out}[i,j]$ from the input feature data $FD_{out}[i]$ for the i-th layer at the layout position j ($0<=j<E$, E is the expected number of subdata blocks), then in addition to $RLD_{in}[I,j,0]$, another k+1 repeatedly calculated data $RLD_{in}[I,j,k+1]$ with a height of $HS_{in}[i,j]$ is also included on the left side of the subdata block $S_{in}[i,j]$, and the width of $RLD_{in}[i,j,k+1]$ is equal to the product of the width of $RLD_{out}[i,j,k]$ and $W_S[i]$, wherein $W_S[i]$ represents the stride of the kernel of related parameters for the operation in the i-th layer in the width direction.

If the right boundary of subdata block $S_{in}[i,j]$ from the input feature data $FD_{in}[i]$ for the i-th layer at layout position j ($0<=j<E$, E is the expected number of subdata blocks) is in $FD_{in}[i]$, it may be determined that $S_{in}[i,j]$ includes repeatedly calculated data $RRD_{in}[i,j,0]$ with a height of $HS_{in}[i,j]$ on the right side, and the width of $RRD_{in}[i,j,0]$ is $|W_K[i]/2|$.

If k+1 repeatedly calculated data $RRD_{out}[i,j,k]$, $k>=0$ is included on the right side of $S_{out}[i,j]$, then in addition to $RRD_{in}[i,j,0]$, another k+1 repeatedly calculated data $RRD_{in}[i,j,k+1]$ with a height $HS_{in}[i,j]$ are also included on the right side of subdata block $S_{in}[i,j]$, and the width of $RRD_{in}[i,j,k+1]$ is equal to the product of the width of $RRD_{out}[i,j,k]$ and $W_S[i]$.

Similarly, if the upper side boundary of subdata block $S_{in}[i,j]$ is in $FD_{in}[i]$, it may be determined that $S_{in}[i,j]$ includes repeatedly calculated data $RUD_{in}[i,j,0]$ with a width $WS_{in}[i,j]$ on the upper side, and the height of $RUD_{in}[i,j,0]$ is $|H_K[i]/2|$, wherein $H_K[i]$ represents the height of the kernel of related parameters used for the operation in the i-th layer, and $WS_{in}[i,j]$ represents the width of $S_{in}[i,j]$.

If k+1 repeatedly calculated data $RUD_{out}[i,j,k]$, k>=0 are included on the upper side of subdata block $S_{out}[i,j]$, then in addition to $RUD_{in}[i,j,0]$, another k+1 repeatedly calculated data $RUD_{in}[i,j,k+1]$, with a width of $WS_{in}[i,j]$ are also included on the upper side of subdata block $S_{in}[i,j]$, and the height of $RUD_{in}[i,j,k+1]$ is equal to the product of the height of $RUD_{out}[i,j,k]$ and $H_S[i]$, wherein $H_S[i]$ represents the stride of the kernel of related parameters for the operation in the i-th layer in the height direction.

Similarly, if the lower side boundary of subdata block $S_{in}[i,j]$ is in $FD_{in}[i]$, it may be determined that the repeatedly calculated data $RDD_{in}[i,j,0]$ with a width $WS_{in}[i,j]$ is included on the lower side of Sin[i,j], and the height of $RDD_{in}[i,j,0]$ is $|H_K[i]/2|$.

If k+1 repeatedly calculated data $RDD_{out}[i,j,k]$, k>=0 are included on the lower side of $S_{out}[i,j]$, then in addition to $RDD_{in}[i,j,0]$, another k+1 repeatedly calculated data $RDD_{in}[i,j,k+1]$ with a width of $WS_{in}[i,j]$ are also included on the lower side of subdata block $S_{in}[i,j]$, and the height of $RDD_{in}[i,j,k+1]$ is equal to the product of the height of $RDD_{out}[i,j,k]$ and $H_S[i]$.

In one embodiment, while the layout position, width and height of each subdata block from the input feature data for each layer of the selected layers are determined in the aforementioned step S310, the position, width and height of each repeatedly calculated data from each subdata block of the input feature data may be determined and recorded in order to be used in the subsequent step S325.

In other embodiments, when the subdata block from the output feature data for a later layer of the two layers to be performed elementwise add operation in step S325, firstly, the repeatedly calculated data in each subdata block of the output feature data for the layer is determined, then the position, width, and height of the repeatedly calculated data from each subdata block of the subdata block from the output feature data for an earlier layer of the two layers to be performed elementwise add operation are determined by the manner that the repeatedly calculated data in each subdata block from the input feature data for each layer are inversely derived layer by layer from the last layer as described above, and on this basis, the actual data range of each subdata block from the output feature data for the earlier layer is determined.

After obtaining the corresponding output subdata blocks by step S325, the exemplary method 300 may proceed to step S330 to combine all of the obtained output subdata blocks together.

Figure 7:
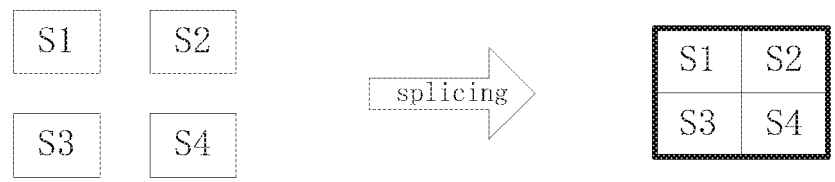
FIG. 7 illustrates an example of obtaining an output subdata block for the last layer to obtain an actual output feature data according to a combination of embodiments of the present disclosure.

In one embodiment, if it is determined in step S305 that it is expected to divide the output feature data for the last layer, then in step S330, each output subdata block for the last layer may be directly spliced (reverse process of dividing) together according to their respective layout positions, such that the actual output feature data of the last layer is obtained. For example, as shown in FIG. 7, the output subdata block S1 to S4 are spliced together according to their respective layout positions, and it is ensured that there is no overlapping portion among each output subdata block, then the actual output feature data for the last layer shown on the right side of the arrow may be obtained.

Figure 8:
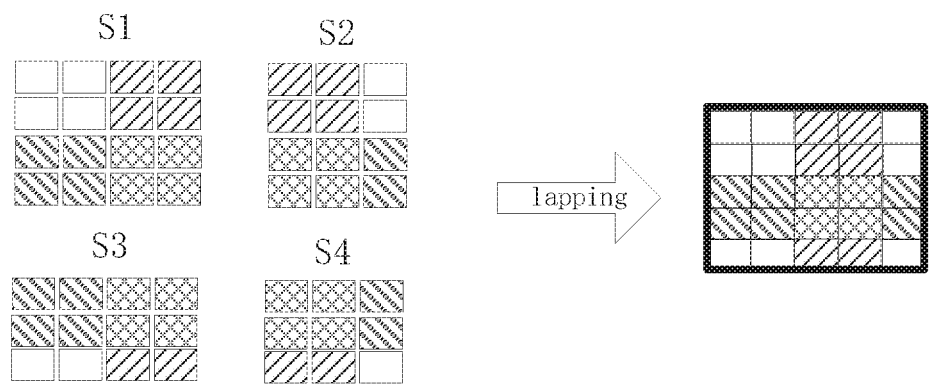
FIG. 8 illustrates an example of obtaining an output subdata block for the last layer to obtain an actual output feature data according to a combination of embodiments of the present disclosure.

If it is determined in step S305 that it is expected to split the output feature data for the last layer, then as shown in FIG. 8, each actual output subdata block for the last layer may be lapped (the reverse process of splitting, i.e., there may be overlapping among each subdata blocks during combination) according to their respective layout positions in step S330, such that the actual output feature data of the last layer is obtained. In FIG. 8, for example, a portion in the output subdata block S2 that is not overlapped with the output subdata block S1 (i.e., the rightmost column in S2) may be spliced to the right side of the output subdata block S1, a portion of the output subdata block S3 that is not overlapped with the output subdata block S1 (i.e., the bottom row in S3) may be spliced to the lower side of the output subdata block S1, then, a portion of the output subdata block S4 that is not overlapped with the output subdata block S3 and the output subdata block S2 (i.e., the blank block at the bottom right corner of S4) may be spliced to the lower right corner of the output subdata block S1, then the actual output feature data of the last layer shown on the right side of the arrow may be obtained. Portions of other output subdata blocks that do not include overlapping data to obtain an actual output feature data of the last layer may be gradually spliced, for example, on the basis of S4. In other examples, it may also firstly splice S1 and S2 together and splice S3 and S4 together, then the obtained two intermediate subdata blocks are lapped together so as to obtain the actual output feature data for the last layer.

In another embodiment, the data from each output subdata block may be directly output to or stored in a corresponding storage position in a memory, such that the output and/or storage of the actual output feature data for the last layer is completed while the output and/or storage of all output subdata blocks is completed.

As described above, in the case where the input feature data for the first layer are provided to the first layer and the operations in the selected layers are performed, the size of the output feature data for the last layer or the size of the required storage space may be determined or known in advance. Thus, a storage space (continuous or discontinuous) may be allocated for the actual output feature data from the last layer, and the size thereof may accommodate the output feature data output by the last layer, and a corresponding storage position of each data in the output feature data for the last layer may be determined.

Figure 9:
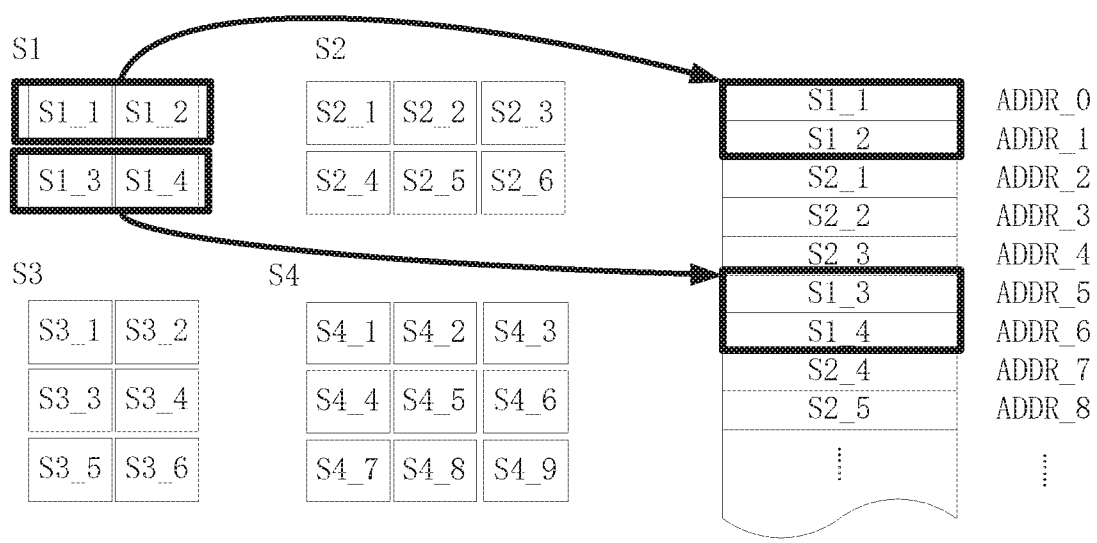
FIG. 9 illustrates an example of obtaining an output subdata block for the last layer to obtain an actual output feature data according to a combination of embodiments of the present disclosure.

In step S330, each data in each output subdata block may be stored at a corresponding storage position in the memory. For example, as shown in FIG. 9, data S1_1, S1_2, S1_3, and S1_4 in the output subdata block S1 may be stored at memory addresses ADDR_0, ADDR_1, ADDR_5, and ADDR_6 in the memory, respectively. Similarly, the data in the output subdata blocks S2, S3, and S4 may be stored separately at corresponding storage positions in the memory. Then the data stored in the twenty-five (In the example of FIG. 8, S1 includes four data; S2 includes six data; D3 includes six data, and S4 includes nine data) memory blocks beginning from ADDR_0 in the memory space corresponds to the actual output feature data for the last layer.

As described above, if it is expected to split the output feature data for the last layer in step S305, overlapping portions may exist among each actual output subdata block from the output feature data for the last layer obtained in step S325. For example, as shown in FIG. 10, an overlapping portion (i.e., the shadowed portion in S1 and S2 in FIG. 10) exist between the output subdata blocks S1 and S2, wherein data S1_2 in S1 overlaps with data S2_1 in S2, and data S1_4 in S1 overlaps with data S2_4 in S2.

Accordingly, in one embodiment, the actual position of each output subdata block in the output feature data for the last layer may be determined in a manner similar to the manner used to determine the actual position of each subdata block from the input feature data for the first layer in step S315. Then the address of the corresponding storage position of each data in each data block may be determined according to the actual position of each output subdata block.

For example, if the storage address of the data (e.g., S1_1 in S1 in FIG. 10) at the most upper left corner in the output subdata block S[0] with a layout position being 0 (alternatively, there is no other output subdata block on the left side or upper side) is determined as ADDR_0, the j value in the corresponding storage address ADDR_j for any data D from any other output subdata blocks S[i] (0<=i<E, E is the expected number of subdata block determined in step S305) may be determined as $J=W*(y_S+y_{off})+x_S+x_{off}$, wherein W is the width of the output feature data of the last layer, $(x_S, y_S)$ represents the coordinates of the actual position of the output subdata block S[i], and $x_{off}$ represents the offset of data D in the output subdata block S[i] relative to $(x_S, y_S)$ in the width direction, $y_{off}$ represents the offset of data D in the output subdata block S[i] relative to $(x_S, y_S)$ in the height direction.

Figure 10:
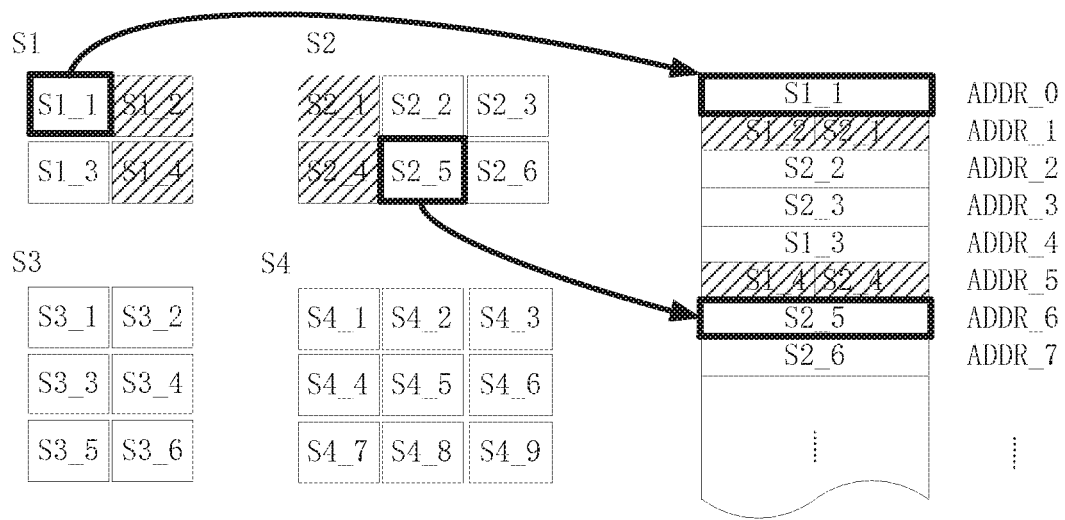
FIG. 10 illustrates an example of obtaining an output subdata block for the last layer to obtain an actual output feature data according to a combination of embodiments of the present disclosure.

For example, in the example of FIG. 10, the width of the output feature data for the last layer is 4, and the coordinate of the actual position in S2 is (1, 0), thus, for example, the corresponding storage address of data S2_5 in S2 may be determined as ADDR_6, wherein J=4*(0+1)+1+1=6.

When storing each data from each output subdata block, it may be checked whether data has been stored at the corresponding storage position. If not, the data may be stored at the storage position. If so, the storage of the data may be skipped, or the data at the storage position may be covered or overwritten.

Such a manner of determining the storage position or storage address of data in each of the output subdata block may also be applied to the case of dividing.

In addition, the data in each output subdata block may be output or stored in parallel to a corresponding storage position in the memory.

Figure 11:
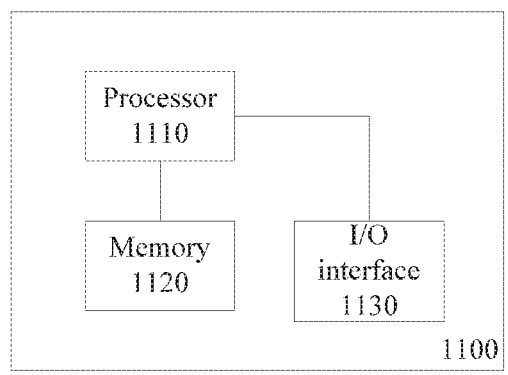
FIG. 11 illustrates an exemplary apparatus for adapting feature data in a convolutional neural network according to an embodiment of the present disclosure.
Figure 12:
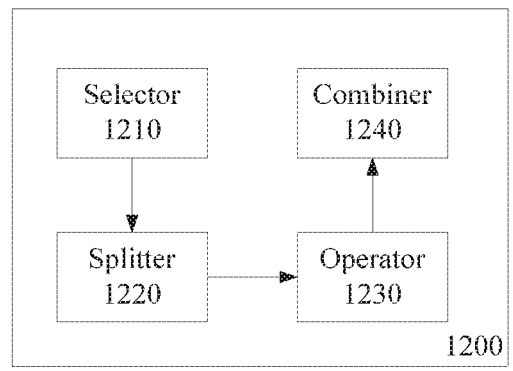
FIG. 12 illustrates an exemplary apparatus for adapting feature data in a convolutional neural network according to another embodiment of the present disclosure.

FIG. 11 and FIG. 12 illustrate a block diagram of an apparatus for adapting parameters of a neural network in accordance with an embodiment of the present disclosure.

As shown in FIG. 11, the exemplary apparatus 1100 may include one or more processors 1110. The processor 1110 may be a processing unit in any form that is able to process data and/or execute instructions, such as a general purpose CPU, a GPU, or a dedicated processor for a neural network or accelerator. For example, the processor 1110 may perform a method for adapting feature data of a neural network according to an embodiment of the present disclosure. Further, the processor 1110 may also control other components in the apparatus 1100 to perform the expected functions.

The processor 1110 may be connected to a memory 1120 and an I/O interface 1130 through a bus system and/or a connection mechanism in other forms (not shown).

The memory 1120 may include a computer readable and writable storage medium in various forms, for example, a volatile memory and/or a non-volatile memory. The volatile memory may include, for example, a random access memory (RAM) and/or a cache, etc. The non-volatile memory may include, for example, a read only memory (ROM), a hard disk, a flash memory, etc. The readable and writable storage medium may include, for example, but not limited to, an electric, a magnetic, an optical, an electromagnetic, an infrared, or a semiconductor system, apparatus, or device or any combination of the above. For example, in a case of matching a neural network dedicated processor, the memory 1120 may be a RAM on a chip that carries a dedicated processor. The memory 1120 may include program instructions for instructing the device 1100 to perform the method for adapting the feature data in the neural network according to an embodiment of the present disclosure.

The I/O interface 1130 may be used for providing parameters or data to the processor 1110 and outputting the result data processed by the processor 1110.

As shown in FIG. 12, the exemplary apparatus 1200 may include a selector 1210 and a splitter 1220.

The selector 1210 may be configured to select a plurality of consecutive layers in a convolutional neural network. The splitter 1220 may be configured to determine the expected number of subdata blocks from the output feature data for the last one of the plurality of layers and the layout position, width, and height of each subdata block, and to determine the layout position, width, and height of each subdata block from the input feature data for the current layer in each current layer of the plurality of layers according to a layout position, width, and height of each subdata block from the output feature data for the current layer. In one embodiment, the selector 1210 may be configured to perform, for example, step S301 in the exemplary method 300.

The splitter 1220 may also be configured to determine the actual position of each subdata block from the input feature data for the first layer of the plurality of layers in the input feature data of the first layer, and to obtain an expected number of subdata blocks of the input feature data for the first layer according to the actual position, width and height of each subdata block from the input feature data for the first layer. In one embodiment, the splitter 1220 may be configured to perform, for example, steps S305 to S320 in the exemplary method 300.

As shown in FIG. 12, the exemplary apparatus 1200 may further include an operator 1230 and a combiner 1240.

The operator 1230 may be configured to perform operations in a plurality of layers for each subdata block of the first layer to obtain corresponding output subdata blocks. In one embodiment, the operator 1230 may be configured to perform, for example, step S320 in exemplary method 300 in series or in parallel.

The combiner 1240 may be configured to combine each output subdata block output from the operator together to obtain the actual output feature data for the last layer. In one embodiment, the combiner 1240 may be configured to perform, for example, step S330 in exemplary method 300 in series or in parallel.

It should be appreciated that the apparatus 1100 and apparatus 1200 shown in FIG. 11 and FIG. 12 are only exemplary but not limiting. Based on the demand, the apparatus which may be used to adapt the feature data of the neural network according to embodiments of the present disclosure may have other components and/or structure.

As described above, the input feature data of a specified layer in a convolutional neural network may be split into an expected number of subdata blocks by the method and/or apparatus according to an embodiment of the present disclosure. The results obtained after each subdata is provided to the designated layer as the input and performed operations in the plurality of layers respectively, is the same as the result obtained after the input feature data before splitting is provided to the designated layer as the input and performed operations in the plurality of layers respectively. By such splitting, the operation in several layers in a convolutional neural network may be parallelized to improve processing efficiency. Further, high speed memory associated with the processor may also be efficiently utilized, for example, operation in a plurality of consecutive layers in a convolutional neural network may be performed in a fused manner, such that the number of times of data transportation during operation in the convolutional neural network may be reduced, and the processing efficiency may be improved.

Unless otherwise required clearly in the context, throughout the description and claims, the wordings such as "comprise" and "include" are to be construed in an inclusive sense, as opposed to an exclusive or exhaustive sense, that is to say, in a sense of "including but not limited to". Additionally, when used in the disclosure, the wordings of "herein", "above", "below" and similar wordings shall refer to the disclosure as a whole but not to any specific portion of the disclosure. When being permitted in the context, the wordings in singular or plural used in the above descriptions may also include the plural or singular, respectively. The wording of "or" in reference to a list of two or more items covers all of the following interpretations of the wording: any of the items in the list, all of the items in the list, and any combination of the items in the list.

The above detailed description of the embodiments of the present disclosure is not intended to be exhaustive or to limit the disclosure to the precise form disclosed above. While specific embodiments of, and examples for, the disclosure are described above for illustrative purposes, various equivalent modifications are possible within the scope of the disclosure, as those skilled in the art will recognize. For example, while the processes or blocks are presented in a given order, alternative embodiments may perform routines including these steps in a different order or employ a system including these blocks in a different order, and some processes or blocks may be deleted, moved, added, subdivided, combined, and/or modified. Each of these processes or blocks may be implemented in a variety of different ways. Further, while the processes or blocks are shown sometimes as being executed in series, these processes or blocks may instead be executed in parallel, or may be executed at different times.

The teachings of the disclosure provided herein can be applied to other systems, but not necessarily the system described above. The elements and acts of the various embodiments described above may be combined to provide further embodiments.

While some embodiments of the disclosure have been described, these embodiments have been presented by way of example only, but are not intended to limit the scope of the disclosure. Indeed, the novel methods and systems described herein may be embodied in a variety of other forms. Furthermore, various omissions, substitutions and changes in the form of the methods and systems described herein may be made without departing from the spirit of the disclosure.

What is claimed is:

1. A method for adapting feature data in a convolutional neural network, comprising:
   selecting a plurality of consecutive layers in the convolutional neural network, a sum of sizes of output feature data and related parameters of a last layer in the plurality of consecutive layers being less than or equal to a capacity of a cache for caching data relating to operations of the convolutional neural network;
   determining an expected number of subdata blocks and a layout position, a width and a height of each subdata block in the output feature data of the last layer;
   determining, for each current layer in the plurality of layers starting from the last layer, a layout position, a width, and a height of each subdata block of an input feature data for the current layer according to the layout position, the width, and the height of each subdata block of the output feature data of the current layer, until the layout position, the width, and the height of each subdata block of the input feature data for a first layer in the plurality of layers are determined, each subdata block of the input feature data for the first layer being capable of entirely stored in the cache; and
   determining an actual position of each subdata block of the input feature data for the first layer in the input feature data of the first layer;
   wherein the expected number depends on a reference value and a size of the input feature data for each layer of the plurality of layers; and
   wherein the expected number satisfies the following condition:

$E > (\max_{1 < i < N} \{F_i + P_i\})/R,$ where E is the expected number, max is a function that returns a maximum value, N is the number of the plurality of layers, $F_i$ and $P_i$ are respectively sizes of the input feature data and related parameters of the i-th layer in the plurality of layers, and R is the reference value.

2. The method of claim 1, further comprising:
   obtaining each subdata block of the input feature data for the first layer according to the actual position, the width and the height of the subdata block; and
   storing the subdata block entirely in the cache for a convolutional operation of the first layer.

3. The method of claim 1, wherein the sum of sizes of the output feature data and related parameters of the last layer is less than or equal to ⅔ of the capacity of the cache.

4. The method of claim 1, wherein the output feature data of the last layer has a width and a height equal to those of data obtained by splicing all subdata blocks of the output feature data of the last layer together according to the layout position of each subdata block without overlapping each other.

5. The method of claim 1, wherein the width and height of each subdata block of the input feature data for the current layer further depends on a width and a height of a kernel of the related parameters for the current layer, strides of the kernel of the related parameters in width and height, and one or more padding quantities for padding the subdata blocks in one or more of width and height at the current layer.

6. The method of claim 1, further comprising:
   determining an overlapping width and an overlapping height of an overlapping portion between adjacent subdata blocks of the input feature data for the first layer according to the layout position, the width and the height of each subdata block of the input feature data for the first layer and the width and height of the input feature data for the first layer.

7. The method of claim 6, wherein for each current subdata block of the input feature data for the first layer,
   when it is determined that there is no other subdata block on the left and upper sides of the current subdata block according to the layout position of the current subdata block, the actual position of the current subdata block in the input feature data for the first layer is determined to be at an upper left corner of the input feature data for the first layer, when it is determined that there is one or more subdata blocks on the left side of the current subdata block according to the layout position of the current subdata block, the actual position of the current subdata block in the input feature data for the first layer depends on the width and the overlapping width of each subdata block on the left side of the current subdata block, and when it is determined that there is one or more subdata blocks on the upper side of the current subdata block according to the layout position of the current subdata block, the actual position of the current subdata block in the input feature data for the first layer further depends on the width and the overlapping width of each subdata block on the upper side of the current subdata block.

8. The method of claim 2, further comprising:
performing operations of the plurality of layers on each subdata block obtained for the first layer to obtain a corresponding output subdata block; and
combining all of the obtained output subdata blocks together to obtain an actual output feature data for the last layer.

9. The method of claim 8, wherein the operations of the plurality of layers include an elementwise add operation performed on the output feature data of a prior layer in the plurality of layers and the output feature data of a hind layer after the prior layer in the plurality of layers.

10. The method of claim 9, further comprising:
determining a position, a width, and a height of repetitively calculated data in each subdata block of the output feature data of the prior layer.

11. The method of claim 10, wherein for each layer of at least two layers from the prior layer to the hind layer in the plurality of layers, when a first boundary of a first subdata block of the input feature data for the layer is within the input feature data of the layer, the first subdata block includes a first repetitively calculated data on a first side where the first boundary is located, and a width or height of the first repetitively calculated data in a first direction corresponding to the first side depends on a width or height of the kernel of related parameters for the layer in the first direction.

12. The method of claim 11, wherein when a second subdata block of the output feature data of the layer includes one or more second repetitively calculated data on a side corresponding to the first side, and the second subdata block has the same layout position as the first subdata block, the first subdata block further includes one or more third repetitively calculated data on the first side, the number of the third repetitively calculated data is equal to the number of the second repetitively calculated data, and an width or height of each third repetitively calculated data depends on product of a width or height of the corresponding second repetitively calculated data in the first direction and a stride of the kernel of related parameters for the layer in the first direction, respectively.

13. The method of claim 10, further comprising:
when performing the elementwise add operation, determining an actual data range used for the elementwise add operation in the output feature data of the prior layer according to the position, width and height of the repetitively calculated data in the output feature data of the prior layer.

14. An apparatus for adapting feature data in a convolutional neural network, comprising:
a memory having instructions stored thereon; and
one or more processors configured to execute the instructions, execution of the instructions causing the one or more processors to perform the method of claim 1.

15. An apparatus for adapting feature data in a convolutional neural network, comprising:
a selector configured to select a plurality of consecutive layers in the convolutional neural network, a sum of sizes of output feature data and related parameters of a last layer in the plurality of consecutive layers being less than or equal to a capacity of a cache for caching data relating to operations of the convolutional neural network; and
a splitter configured to
determine an expected number of subdata blocks and a layout position, a width and a height of each subdata block of the output feature data of the last layer;
determine, for each current layer in the plurality of layers starting from the last layer, a layout position, a width, and a height of each subdata block of an input feature data for the current layer according to the layout position, the width, and the height of each subdata block of the output feature data of the current layer, until the layout position, the width, and the height of each subdata block of the input feature data for a first layer in the plurality of layers are determined, each subdata block of the input feature data for the first layer being capable of entirely stored in the cache; and
determine an actual position of each subdata block of the input feature data for the first layer in the input feature data of the first layer;
wherein the expected number depends on a reference value and a size of the input feature data for each layer of the plurality of layers; and
wherein the expected number satisfies the following condition:

$$E > (\max_{1 \leq i \leq N} \{F_i + P_i\})/R,$$

where E is the expected number, max is a function that returns a maximum value, N is the number of the plurality of layers, $F_i$ and $P_i$ are respectively sizes of the input feature data and related parameters of the i-th layer in the plurality of layers, and R is the reference value.

16. The apparatus of claim 15, wherein the splitter is further configured to:
obtain each subdata block of the input feature data for the first layer according to the actual position, the width and the height of the subdata block; and
store the subdata block entirely in the cache for a convolutional operation of the first layer.

17. The apparatus of claim 16, further comprising:
an operator configured to perform operations of the plurality of layers for each subdata block of the first layer to obtain a corresponding output subdata block.

18. The apparatus of claim 17, further comprising:
a combiner configured to combine each output subdata block output from the operator to obtain an actual output feature data of the last layer.

* * * * *